US010377438B2

(12) United States Patent
Prommel et al.

(10) Patent No.: US 10,377,438 B2
(45) Date of Patent: Aug. 13, 2019

(54) BICYCLE FRAME WITH INTEGRATED ACCESSORIES

(71) Applicant: Pensa LLC, Brooklyn, NY (US)

(72) Inventors: Mark Prommel, Montclair, NJ (US); Kevin O'Leary, Lafayette, LA (US); Pil Ho Chung, Palisades Park, NJ (US); Marco Perry, Brooklyn, NY (US); Thomas Mattimore, New York, NY (US); Thomas Callahan, Brooklyn, NY (US); Lisa Lehman, Brooklyn, NY (US); Otis Poisson, Brooklyn, NY (US)

(73) Assignee: PENSA LLC, Brooklyn, NY (US)

( * ) Notice: Subject to any disclaimer, the term of this patent is extended or adjusted under 35 U.S.C. 154(b) by 11 days.

(21) Appl. No.: 15/520,387

(22) PCT Filed: Oct. 22, 2015

(86) PCT No.: PCT/US2015/057008
§ 371 (c)(1),
(2) Date: Apr. 19, 2017

(87) PCT Pub. No.: WO2016/065203
PCT Pub. Date: Apr. 28, 2016

(65) Prior Publication Data
US 2017/0313376 A1 Nov. 2, 2017

Related U.S. Application Data

(60) Provisional application No. 62/067,818, filed on Oct. 23, 2014.

(51) Int. Cl.
B62K 19/40 (2006.01)
B62K 19/30 (2006.01)
(Continued)

(52) U.S. Cl.
CPC ............... *B62K 19/40* (2013.01); *B62J 6/12* (2013.01); *B62K 19/30* (2013.01); *B60K 3/04* (2013.01);
(Continued)

(58) Field of Classification Search
CPC .... B62K 19/40; B62K 19/30; B62K 2700/34; B62K 3/02; B62K 3/04; B62K 3/06;
(Continued)

(56) References Cited

U.S. PATENT DOCUMENTS 3,187,148 A 6/1965 Dyksterhouse
3,792,307 A 2/1974 Baker
(Continued)

OTHER PUBLICATIONS

Merge—Ride Your Way (Pensa!) [online] retrieved from the internet on Dec. 17, 2015 (Dec. 17, 2015) URL:https://vimeo.com/101456089>, Jul. 22, 2014 (Jul. 22, 2014); Demonstration 0:40, 0:42, 0:44, 0:56, 1:15, 1:17-9, 1:22-9, 1:31-2, and 1:43. (see attached).

(Continued)

Primary Examiner — Joseph M Rocca
Assistant Examiner — Marlon A Arce
(74) Attorney, Agent, or Firm — DLA Piper LLP (US)

(57) ABSTRACT

A bicycle frame assembly including a seat tube having first and second end portions (wherein the seat tube second end portion includes a bend and terminates in a first open end facing a first direction), a down tube having first and second end portions (wherein the down tube first end portion is mounted to the seat tube first end portion, and the down tube second end portion includes a bend and terminates in a second open end facing a second direction opposite to the first direction), and a top tube having first and second end portions (wherein the top tube first end portion is mounted to the seat tube second end portion and terminates in a third
(Continued)

open end facing the first direction, and the top tube second end portion is mounted to the down tube second end portion and terminates in a fourth open end facing the second direction).

20 Claims, 15 Drawing Sheets

(51) Int. Cl.
  *B62J 6/12* (2006.01)
  *B62K 3/02* (2006.01)
  *B62K 3/06* (2006.01)
  *B62K 3/08* (2006.01)
  *B60K 3/04* (2006.01)
  *B62K 3/10* (2006.01)
  *B62J 6/02* (2006.01)
  *B62J 6/04* (2006.01)

(52) U.S. Cl.
  CPC .. *B62J 6/02* (2013.01); *B62J 6/04* (2013.01); *B62K 3/02* (2013.01); *B62K 3/06* (2013.01); *B62K 3/08* (2013.01); *B62K 3/10* (2013.01); *B62K 2700/34* (2013.01)

(58) Field of Classification Search
  CPC ...... B62K 3/08; B62K 3/10; B62J 6/12; B62J 6/02; B62J 6/04
  See application file for complete search history.

(56) References Cited

U.S. PATENT DOCUMENTS

| | | | | |
|---|---|---|---|---|
| 2004/0239070 | A1* | 12/2004 | Chao | B62K 3/10 280/278 |
| 2008/0088113 | A1* | 4/2008 | Menayan | B62K 3/04 280/287 |
| 2009/0183356 | A1* | 7/2009 | Lin | B62K 3/04 29/509 |
| 2013/0214506 | A1* | 8/2013 | Vollmer | B62K 19/34 280/281.1 |

OTHER PUBLICATIONS

Designboom Magazine, "Merge Utility Bike by Pensa + Horse Cycles Charges Your Phone While You Ride" [online] (retrieved from the internet on Dec. 17, 2015 (Dec. 17, 2015) <URL http://www.designboom.com/technology/merge-utility-bike-pensa-horse-cycles-charges-phone-08-02-2014/>, Aug. 2, 2014 (Aug. 2, 2014); pp. 1-9. (see attached).

Electrified 3—Vanmoof Commuter Bicycles—Official Website— http://vanmoof.com/electrified/23-electrified-3.html, pp. 1-3, downloaded on Oct. 22, 2015.

* cited by examiner

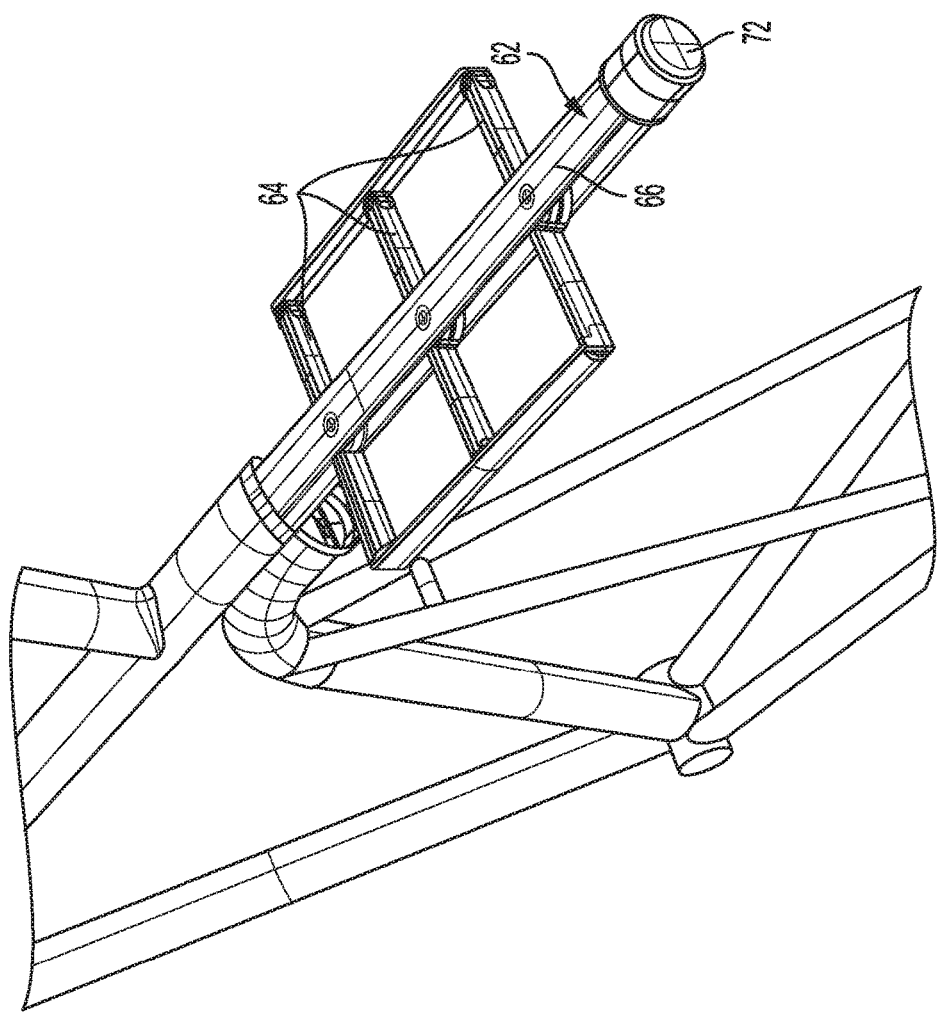

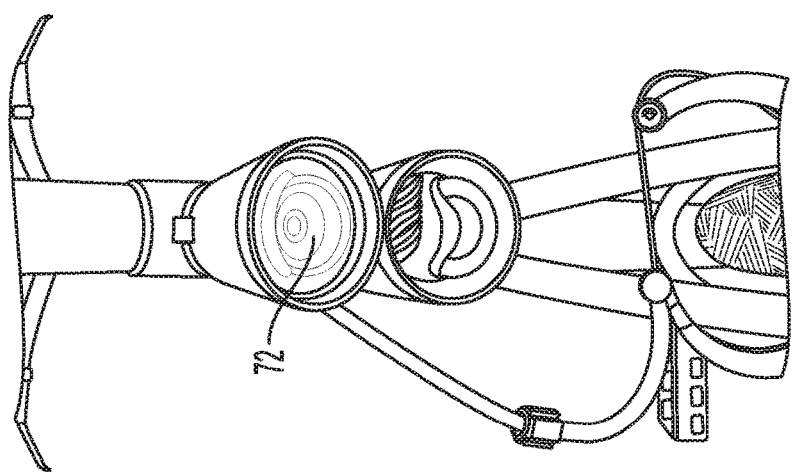

BICYCLE FRAME WITH INTEGRATED ACCESSORIES

RELATED APPLICATIONS

This application claims the benefit of U.S. Provisional Application No. 62/067,818, filed Oct. 23, 2014 and PCT Patent Application No. US2015/057008, filed on Oct. 22, 2015.

FIELD OF THE INVENTION

The present invention relates to bicycles, and more particularly to a bicycle that merges basic frame functionality with integrated accessories (also referred to a Merge or Merge Bike).

BACKGROUND OF THE INVENTION

A conventional bicycle is shown in FIG. 1. The frame of the bicycle includes, among other things, a seat tube 2, down tube 3 and top tube 4 welded to each other and generally oriented in an inverted triangle. The bottom ends of seat and down tubes 2 and 3 are welded together at the point where the pedal crankset 5 is rotatably mounted. From this point, seat and down tubes 2 and 3 extend up in a V-shape. The other end of seat tube 3 is open, through which the seat post 6 inserts. One end of the top tube 4 is welded to the seat tube 2. The other ends of the top and down tubes 4 and 3 are welded to the head tube 7, through which the steering post 8 of the handle bars 11 extends. All ends of the seat, down and top tubes 2, 3, 4 are welded closed except for the open end of the seat tube 2 which receives the seat post 6.

Accessories such as a rear rack 9, water bottle holders 10, lighting, electrical generation, etc. must be externally mounted onto the frame. Because such mounting can be difficult or cumbersome, such accessories are either permanently left mounted (which is not aesthetic and can increase wind drag), or manually removed by the user which is time consuming and runs the risk that the user will unexpectedly need an accessory that had been previously removed elsewhere. There is also a need to make such accessories more functional and aesthetically pleasing, to reduce wind drag when such accessories are not in use, and make the bicycle less bulky and more compact and maneuverable.

BRIEF SUMMARY OF THE INVENTION

The aforementioned problems and needs are addressed by a bicycle frame assembly that includes a seat tube having first and second end portions (wherein the seat tube second end portion includes a bend and terminates in a first open end facing a first direction), a down tube having first and second end portions (wherein the down tube first end portion is mounted to the seat tube first end portion, and the down tube second end portion includes a bend and terminates in a second open end facing a second direction opposite to the first direction), and a top tube having first and second end portions (wherein the top tube first end portion is mounted to the seat tube second end portion and terminates in a third open end facing the first direction, and the top tube second end portion is mounted to the down tube second end portion and terminates in a fourth open end facing the second direction).

A bicycle frame assembly includes a seat tube having first and second end portions, a down tube having first and second end portions (wherein the down tube first end portion is mounted to the seat tube first end portion), and a top tube having first and second end portions (wherein the top tube first end portion is mounted to the seat tube second end portion and the top tube second end portion is mounted to the down tube second end portion). At least one of the seat tube second end portion and the top tube first end portion terminates in an open end. A rack assembly includes a central bar, and a plurality of bars each rotatably mounted to the central bar and rotatable between a first position extending laterally away from the central bar and a second position extending longitudinally along the central bar. The rack assembly is slidably mounted to the open end, and is slidable between an extended position in which the central bar extends out from the open end and the plurality of bars are in the first positions and disposed outside of the open end, and a retracted position in which the plurality of bars are in the second positions and are disposed inside one of the seat tube and the top tube.

Other objects and features of the present invention will become apparent by a review of the specification, claims and appended figures.

BRIEF DESCRIPTION OF THE DRAWINGS

FIGS. 6 and 7A are rear perspective views of the bicycle, with the rear rack in its extended position.

FIG. 8A is a rear perspective view of the bicycle, with the rear light source activated and the rack in its retracted position.

DETAILED DESCRIPTION OF THE INVENTION

Figure 1:
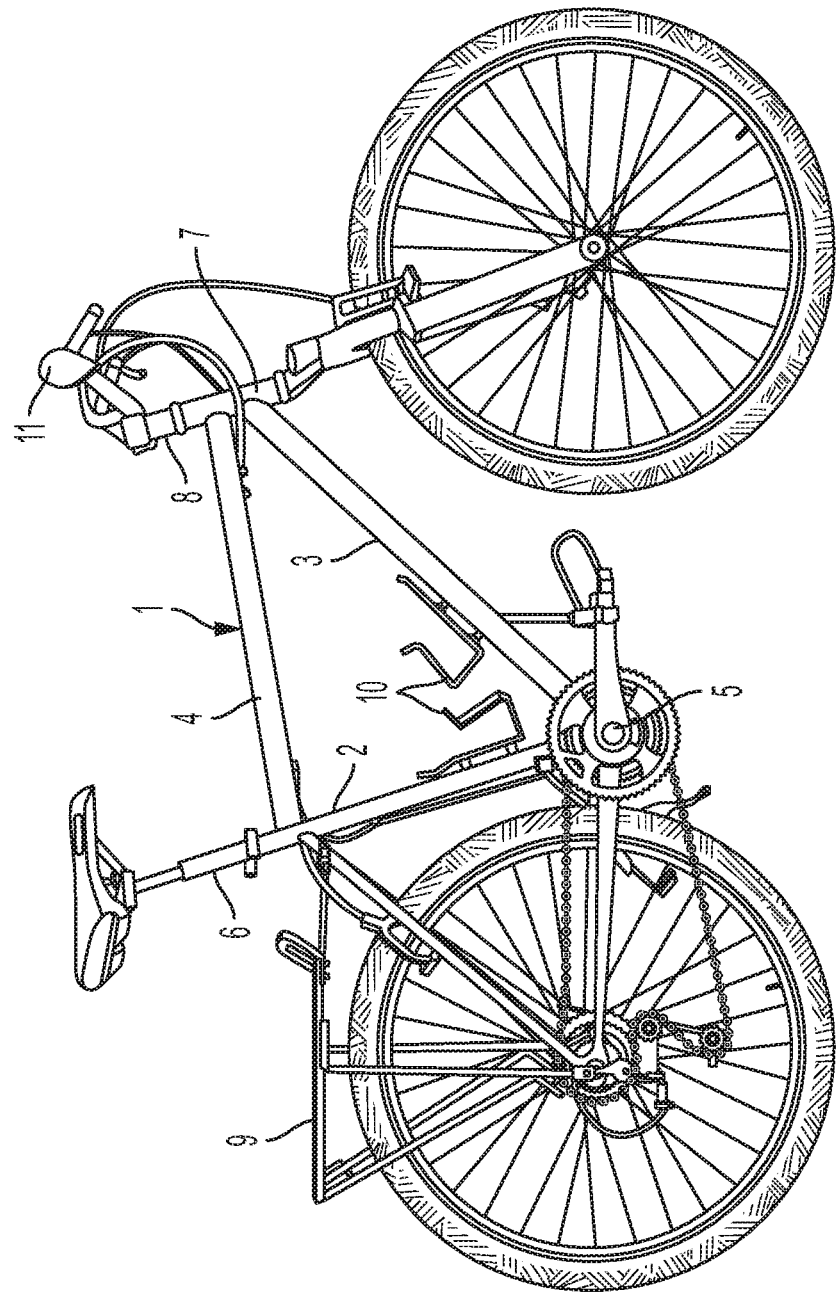
FIG. 1 is a side view of a conventional bicycle.
Figure 2:
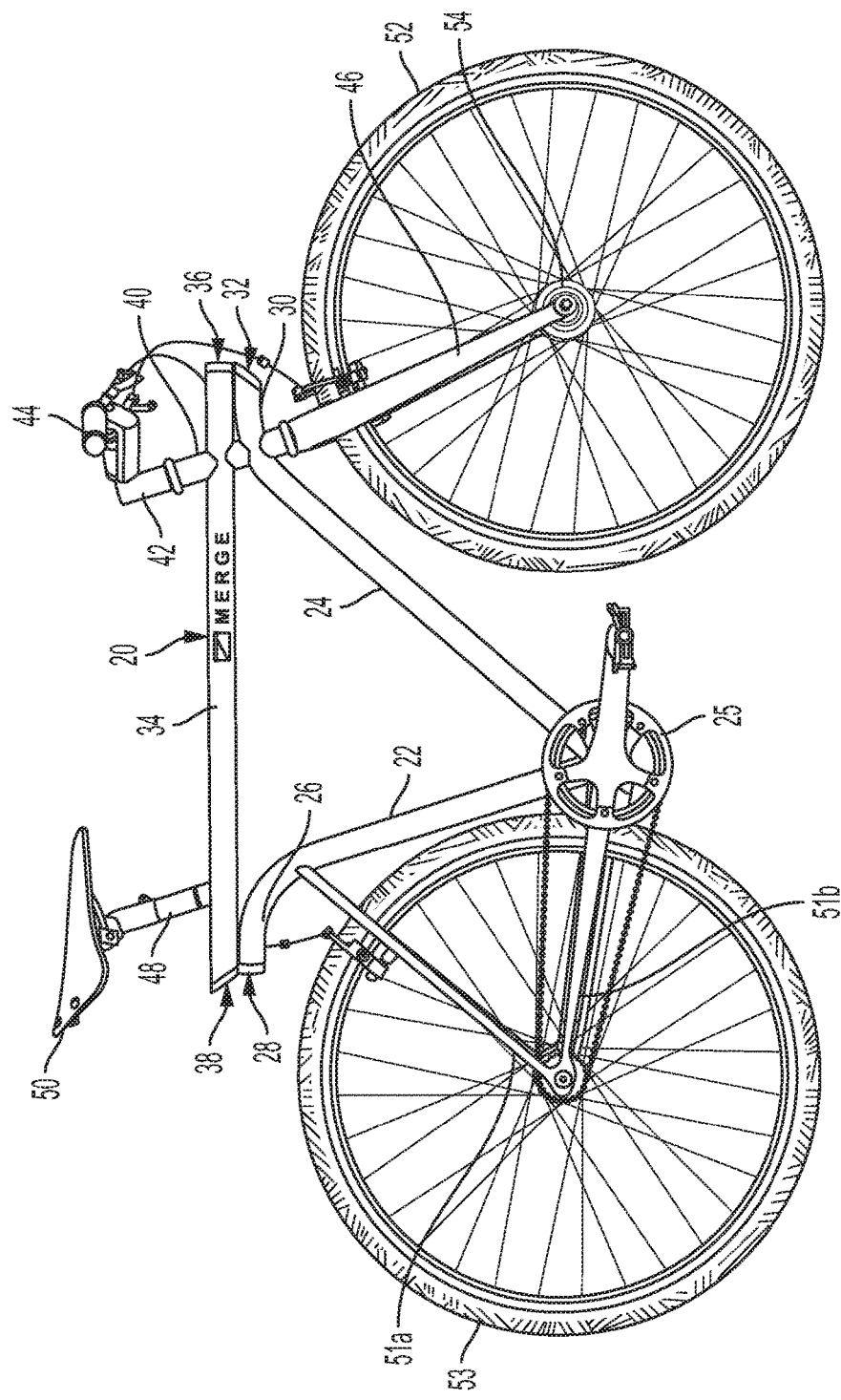
FIG. 2 is a side view of the bicycle of the present invention.

The present invention is an improved bicycle design which utilizes open ended pipe framing to house accessories that can be hidden from view and reduce wind resistance when not in use, and to make the bicycle less bulky, more compact and more maneuverable. The design is generally shown in FIG. 2, and includes a triangular shaped main frame having a seat tube 22 and down tube 24 extending up from a common point (i.e., a V-shape) at which the ends of tubes 22/24 are mounted together where the pedal crankset 25 mounts. Seat tube 22 extends up and terminates in a large radius bend 26 with an open end 28 facing rearward. Down tube 24 extends up and terminates in a large radius bend 30 with an open end 32 facing forward. A top tube 34 is mounted to the large radius bends of seat tube 22 and down tube 24, with a first open end 36 facing forward and positioned over open end 32, and a second open end 38 facing rearward and positioned over open end 28. A head tube 40, through which the steering post 42 that connects the handle bars 44 to the front wheel forks 46, passes through (i.e., traverses through) both the top tube 34 and the down tube 24. This configuration is both stylish as well as functional, as there are two forward facing open tube ends 32 and 36 and two rearward facing open tube ends 28 and 38 to accommodate accessories, and allow users access to the inside of the frame. A seat post 48 (with seat 50 thereon) is mounted to the top tube 34. The front wheel 52 mounts to the front wheel forks 46, and the rear wheel 53 mounts to where the pair of seat stays 51*a* and chain stays 51*b* meet. The other ends of seat stays 51*a* and chain stays 51*b* are mounted to the seat tube 22.

One of the wheels (preferably the front wheel 52) includes a dynamo hub 54, which is a well-known device for generating electricity on bicycles. Specifically, the dynamo hub 54 is a small electrical generator built into the hub of a bicycle wheel, which generates electricity from the rotational movement of the wheel, and has traditionally been used to power lights mounted to the frame or handle bars. The dynamo hub 54 can be a dynamo which generates DC voltages or a low-power magneto that generates AC voltage. The dynamo hub 54 in the bicycle of the present invention is used to power the accessories found in the forward and rearward facing tube open ends 28, 32, 36 and/or 38 of the frame 20.

Figure 3:
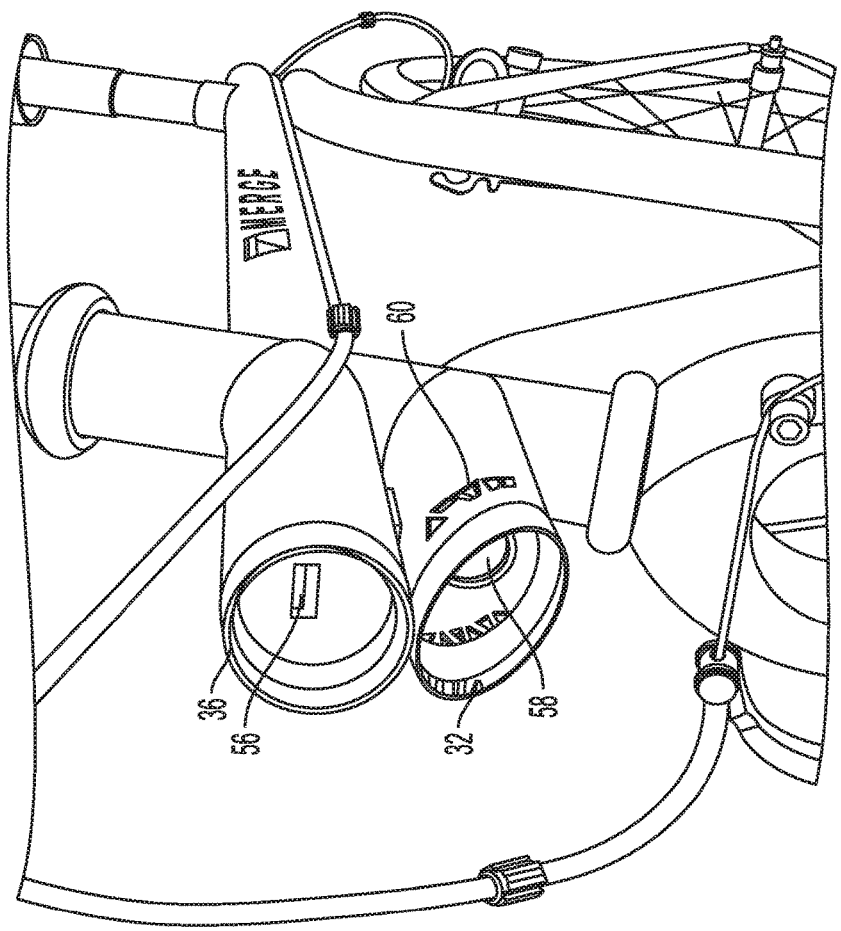
FIGS. 3-4 are front perspective views of the bicycle, illustrating the front light source and the charging port.
Figure 4:
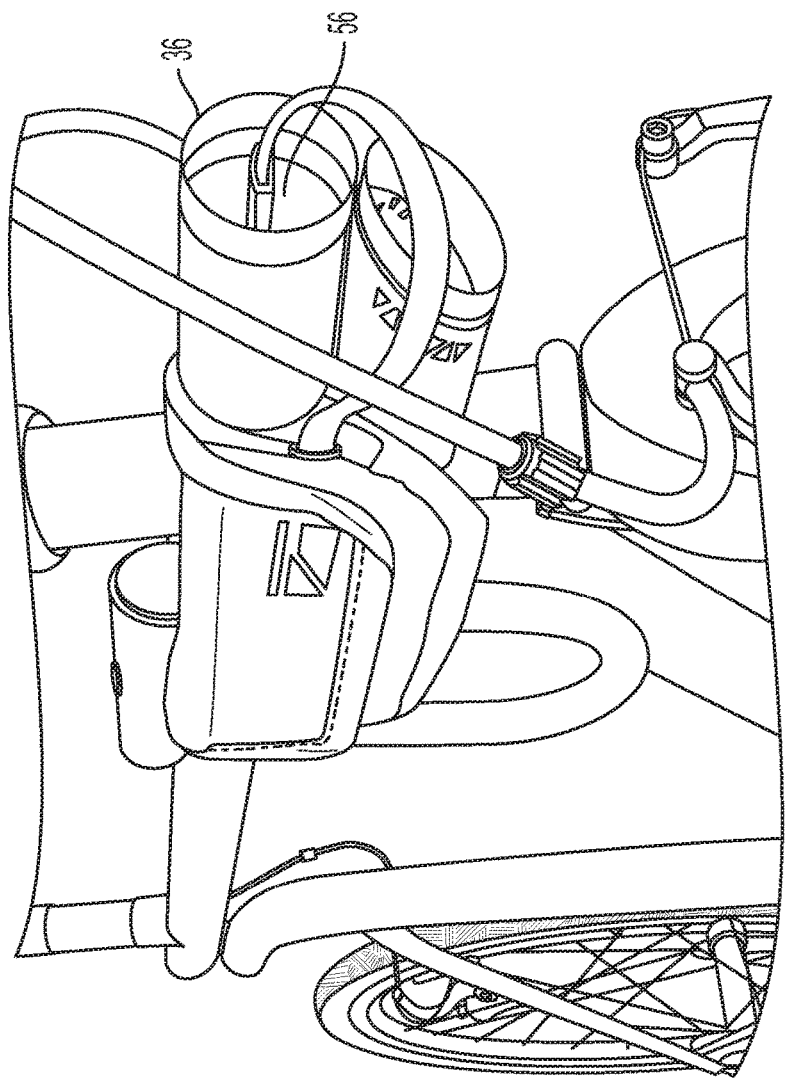

Various accessories can be provided on the open ends 28, 32, 36 and 38. For example, open tube end 36 provides a first access point in the forward facing open end of the top tube 34, and includes a USB charging port 56 for charging USB user devices, as best shown in FIGS. 3 and 4. The USB charging port 56 receives its power from the dynamo hub 54, which is electrically connected to the USB charging port 56 with wires running through the bicycle's frame 20 (and therefore hidden from view). The USB charging port 56 provides a convenient power connection to the dynamo hub 54.

Figure 5:
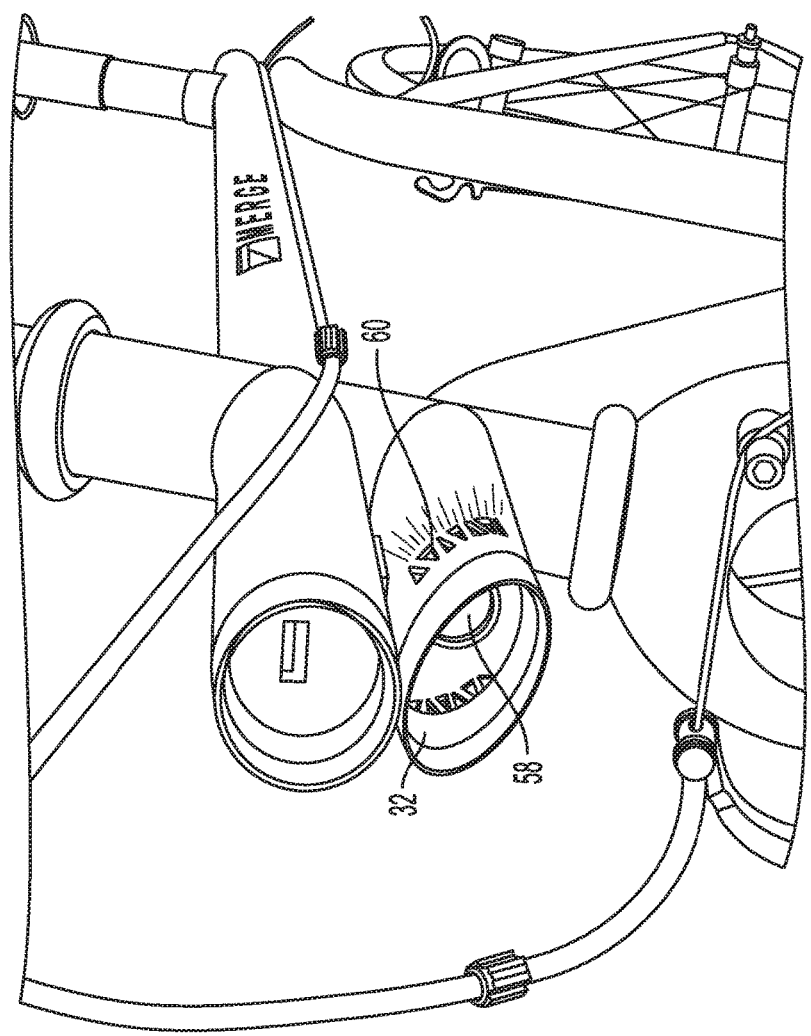
FIG. 5 is a front perspective view of the bicycle, with the front light source activated.

Open tube end 32 provides a second access point in the forward facing open end of the down tube 24, and includes a front light source 58 for forward facing illumination during night time riding and/or forward facing safety light for daytime riding, as best shown in FIGS. 3 and 5. For added safety, the same forward facing light source 58 is also visible from the side of the bicycle, passing through a pattern of side facing apertures 60 in down tube 24 (e.g. formed by laser cutting). The front light source 58 receives its power from the dynamo hub 54, which is electrically connected to the front light source 58 with wires running through the bicycle's frame 20 (and therefore hidden from view).

Figure 6:
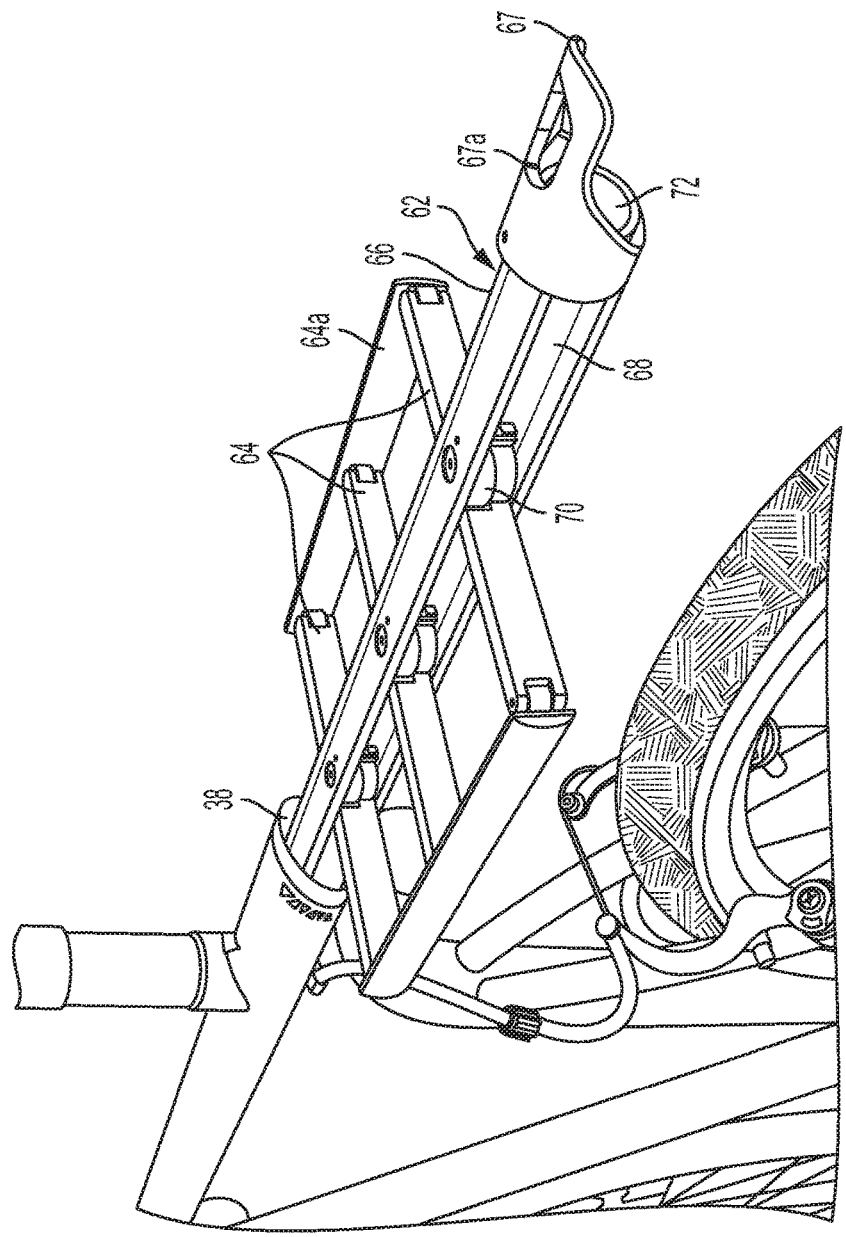
Figure 7B:
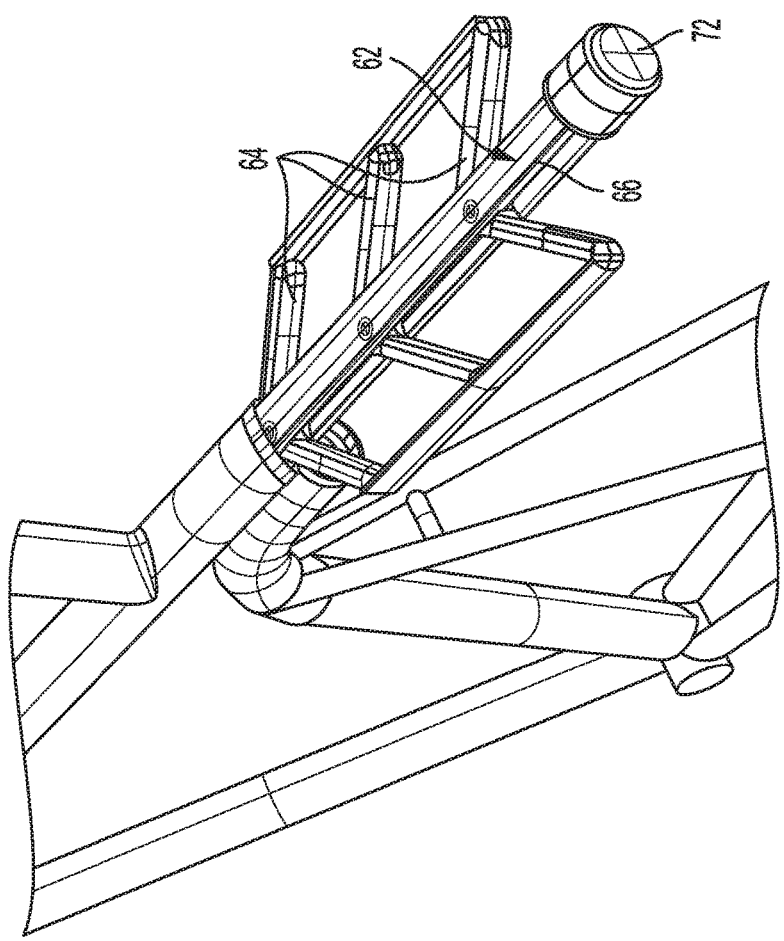
FIG. 7B is a rear perspective view of the bicycle, with the rear rack partially collapsed and between its extended and retracted positions.
Figure 7C:
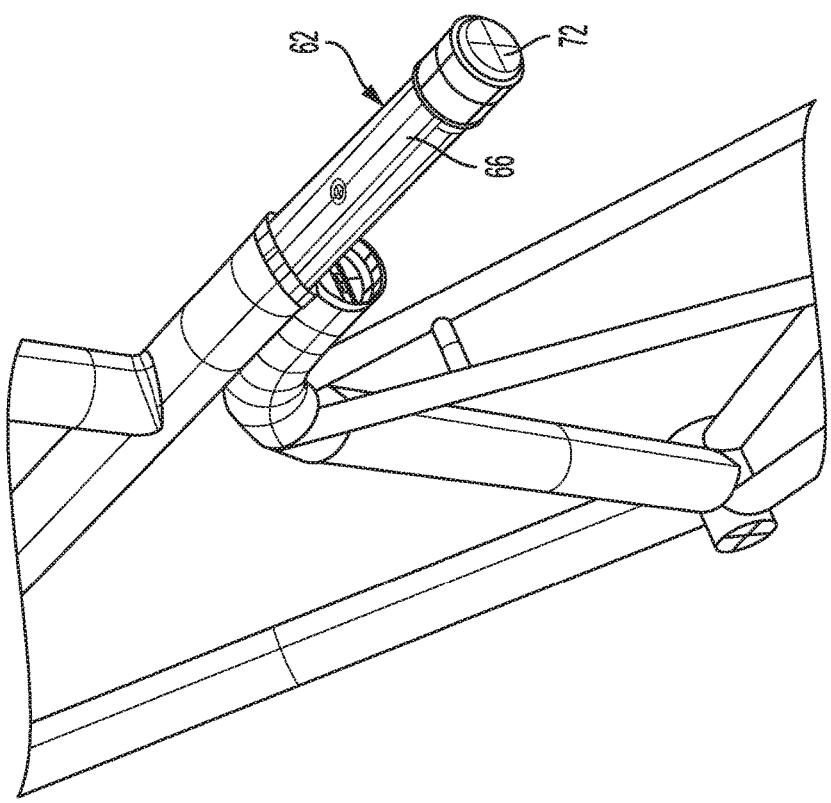
FIG. 7C is a rear perspective view of the bicycle, with the rear rack completely collapsed and between its extended and retracted positions.

Open tube end 38 provides a third access point in the rearward facing open end of the top tube 34, and includes a retractable rack 62 with integrated lighting as shown in FIG. 6. The rack 62 includes spring loaded bars 64 that extend out from a central bar 66 during use in the rack's extended position. The spring loaded bars 64 collapse toward the central bar 66 when the rack 62 is slid into the open end 38 of top tube 34 (i.e., slid from its extended position to its retracted position where the rack is mostly or entirely disposed inside of top tube 34), as illustrated in FIGS. 7A, 7B and 7C. An end bar 64*a* can be rotatably mounted to the distal ends of the bars 64 so that the set of bars 64 rotate together when the first bar 64 engages the end of top tube 34. In a preferred embodiment, the central bar 66 includes channels 68 into which the bars 64 fold upon collapse. Upon extraction from open end 38 of top tube 34, the rack 62 automatically expands back to its expanded configuration shown in FIGS. 6 and 7A under the resilient force of springs 70. The central bar includes a tab 67 with a finger hole 67*a* to allow the user to extract the rack 62 from its retracted position.

Figure 8B:
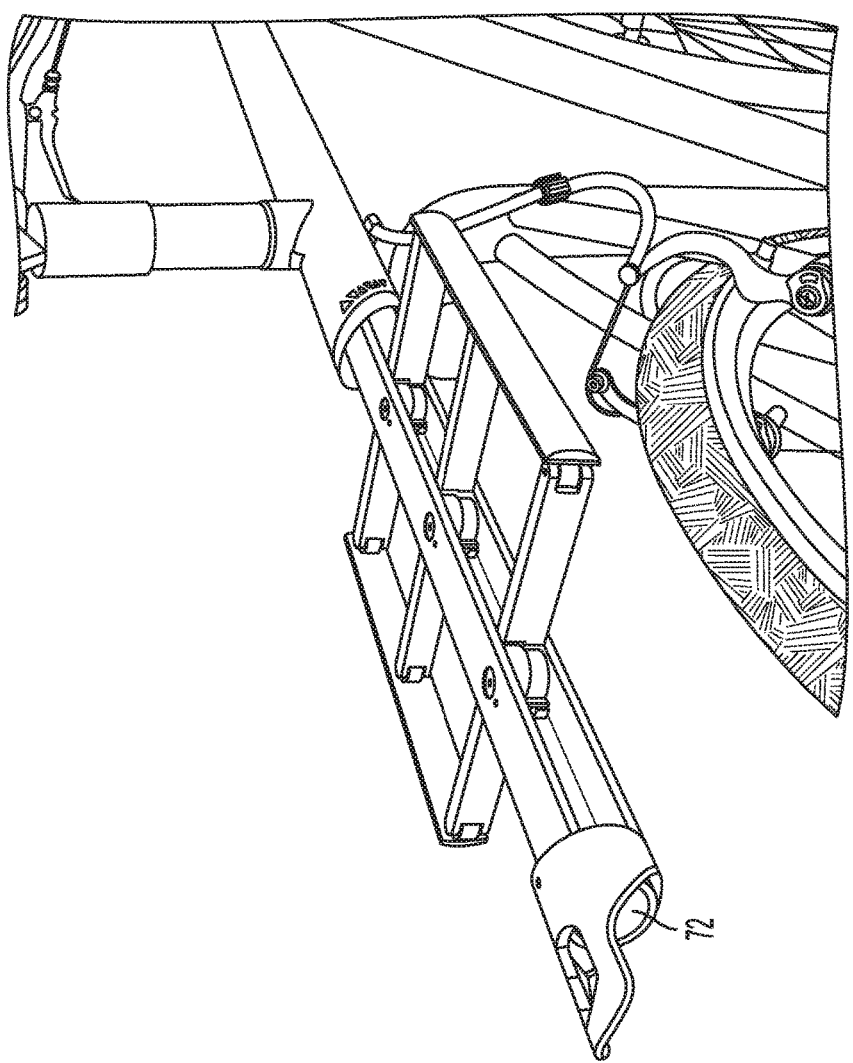
FIG. 8B is a rear perspective view of the bicycle, with the rear light source activated and the rack in its extended position.
Figure 8C:
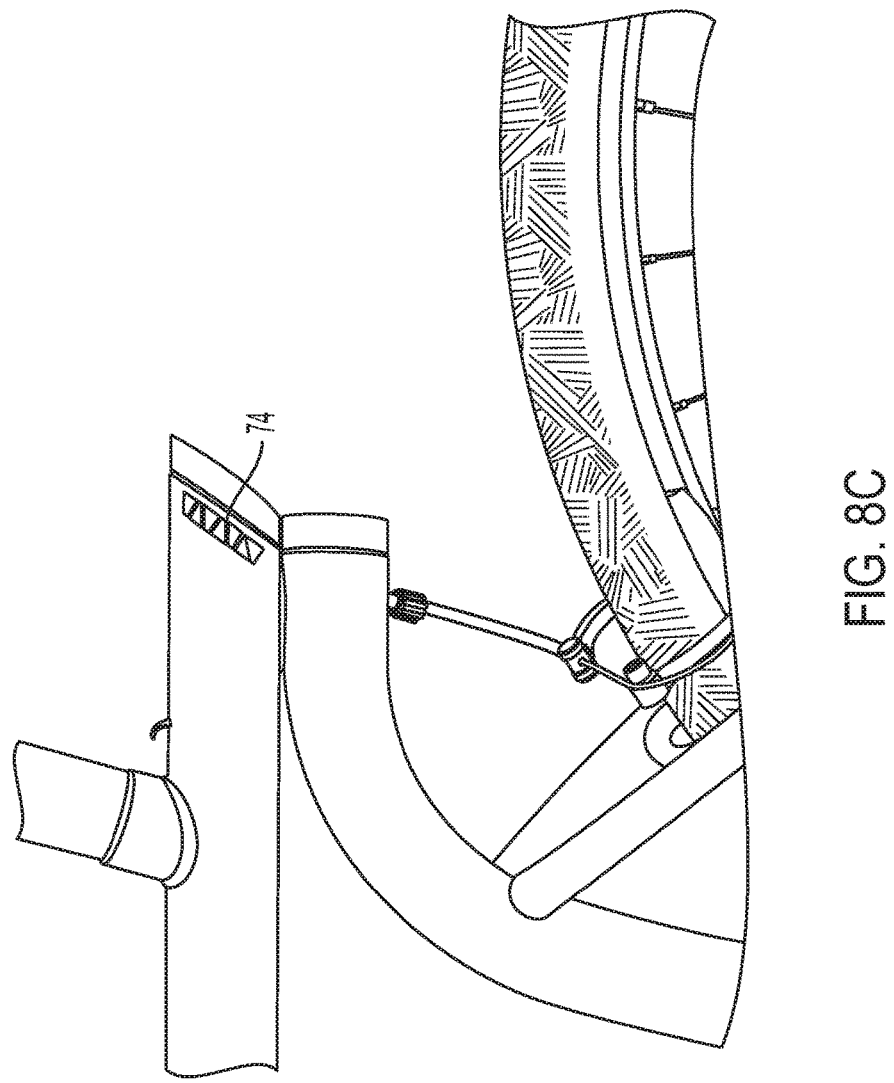
FIG. 8C is a side view illustrating the side facing apertures for the rear light source.

The rack 62 includes a rear light source 72 for rearward facing illumination (preferably red in color). The rear light source 72 receives its power from the dynamo hub 54, which is electrically connected to the rear light source 72 with wires running through the bicycle's frame 20 (and therefore hidden from view). The rear light source 72 is visible no matter if the rack is in its retracted position (i.e., inside the top tube 34) as shown in FIG. 8A, or in its extended position (i.e. extending out from the top tube 34) as shown in FIG. 8B. With the rack in either of its extended or retracted position, the rear light source 72 is always at the rear most point of this portion of the bicycle frame so it is never blocked). For added safety, with the rack in the retracted position, the same rear facing light source 72 is also visible from the side of the bicycle, passing through a pattern of side facing apertures 74 in top tube 34 (e.g. formed by laser cutting).

Figure 9A:
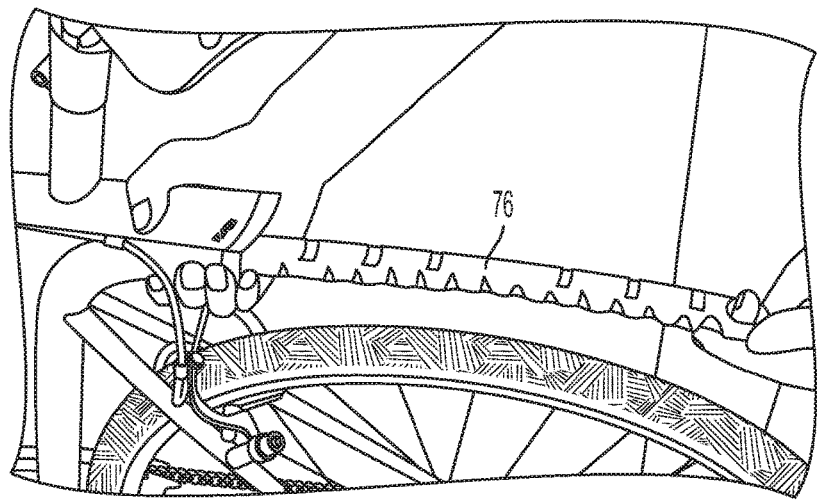
FIGS. 9A and 9B are rear perspective views illustrating the retractable fender in its extended position.
Figure 9B:
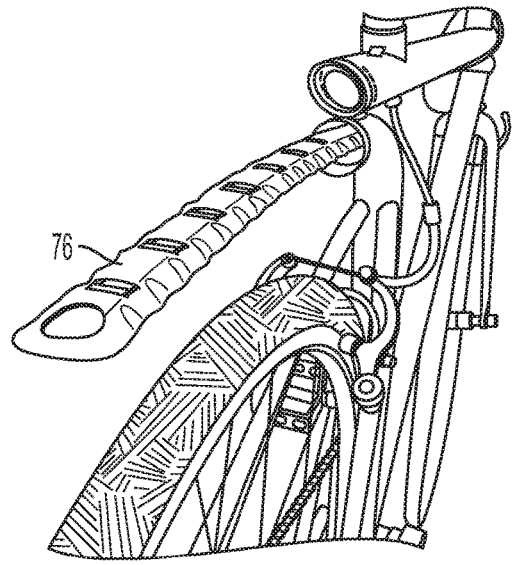
Figure 10:
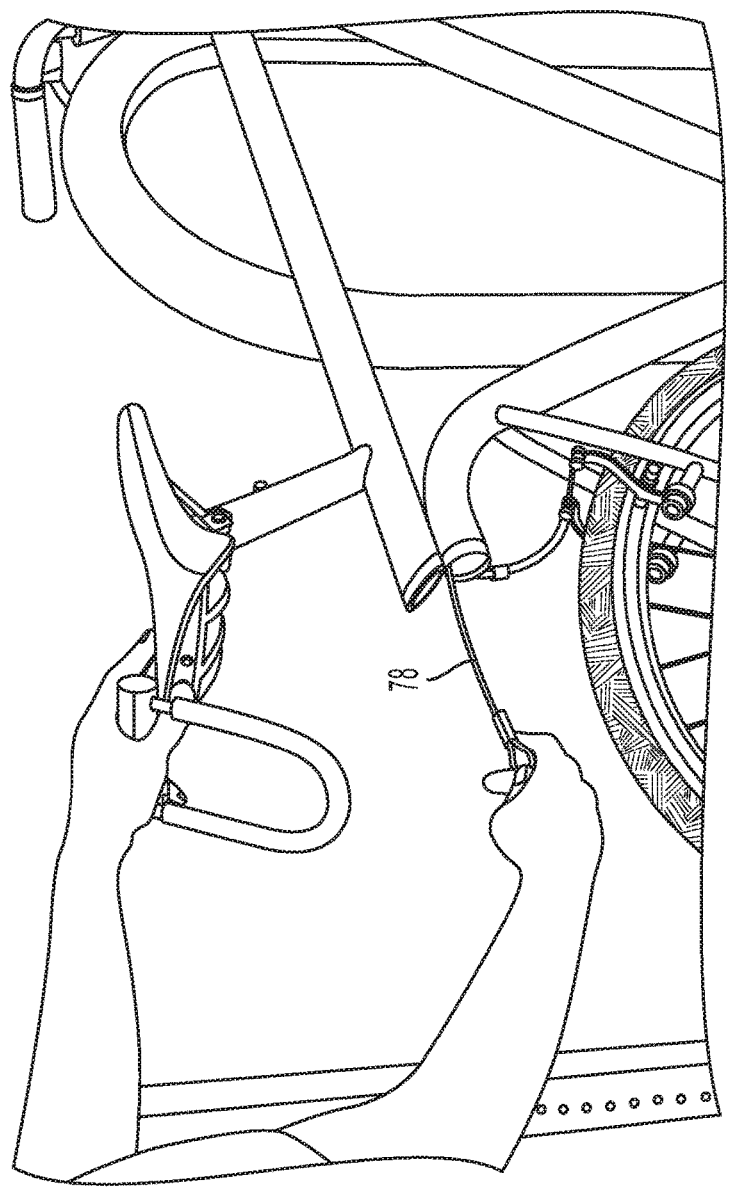
FIG. 10 is a rear perspective view illustrating the lock cable in its partially extended position.
Figure 11:
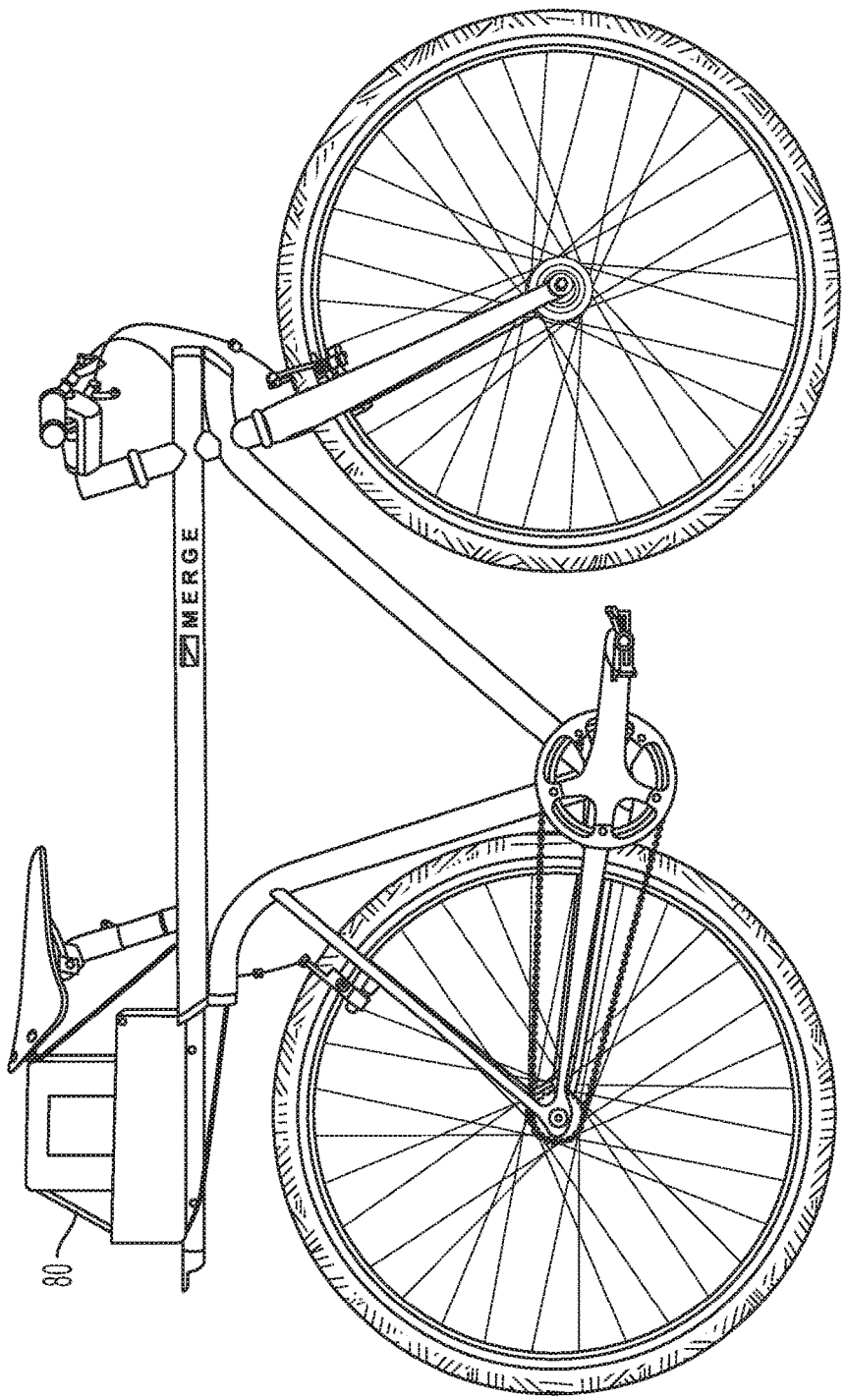
FIG. 11 is a side view illustrating the spring loaded cord for securing packages on the rack.

Open tube end 28 provides a fourth access point in the rearward facing open end of the seat tube 22, an can include one of many possible accessories. For example, the fourth access point can include a retractable fender 76 that can be extended during wet conditions to protect the rider from water being sprayed up by the rear wheel 53, as shown in FIGS. 9A and 9B, and retracted into the seat tube 22 during dry weather to reduce wind resistance and make the bicycle more compact and maneuverable. The fourth access point can include a lock cable 78 for locking the bicycle to protect against theft as shown in FIG. 10, or a bungee cord (elasticized rope) 80 for attaching cargo to the rack 62 as shown in FIG. 11.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. The use of "seat" in "seat tube," "down" in "down tube," "top" in "top tube" and "head" in "head tube" in the claims mean nothing more than simply distinguishing between and providing subsequent antecedent basis for different tubes (i.e. a "seat tube" means nothing more than a "first tube" and so on). Any of the accessories shown and described in one of the open ends 28, 32, 36, and 38 could instead be in any of the other open ends. Lastly, it should be noted that, as used herein, the term "mounted to" inclusively includes "directly mounted to" (no intermediate materials, elements or space disposed there between) and "indirectly mounted to" (intermediate materials, elements or spaced disposed there between).

What is claimed is:

1. A bicycle frame assembly, comprising:
   a seat tube having first and second end portions, wherein the seat tube second end portion includes a bend and terminates in a first open end facing a first direction;

a down tube having first and second end portions, wherein the down tube first end portion is mounted to the seat tube first end portion, and the down tube second end portion includes a bend and terminates in a second open end facing a second direction opposite to the first direction;

a top tube having first and second end portions, wherein the top tube first end portion is mounted to the seat tube second end portion and terminates in a third open end facing the first direction, and wherein the top tube second end portion is mounted to the down tube second end portion and terminates in a fourth open end facing the second direction.

2. The bicycle frame assembly of claim 1, further comprising:
a seat mounted to the top bar.

3. The bicycle frame assembly of claim 1, further comprising:
a rack assembly comprising:
a central bar, and
a plurality of bars each rotatably mounted to the central bar and rotatable between a first position extending laterally away from the central bar and a second position extending longitudinally along the central bar;
wherein the rack assembly is slidably mounted to one of the first and third open ends, and is slidable between an extended position in which the central bar extends out from the one first or third open end and the plurality of bars are in the first positions and disposed outside of the one first or third open end, and a retracted position in which the plurality of bars are in the second positions and are disposed inside one of the seat tube and the top tube.

4. The bicycle frame assembly of claim 3, wherein the central bar comprises one or more channels for receiving the plurality of bars in the second positions.

5. The bicycle frame assembly of claim 3, further comprising:
one or more springs for biasing the plurality of bars toward the first positions.

6. The bicycle frame assembly of claim 3, further comprising:
an end bar rotatably mounted to distal ends of at least some of the plurality of bars.

7. The bicycle frame assembly of claim 3, wherein the central bar terminates with a light source facing the first direction.

8. The bicycle frame assembly of claim 7, further comprising:
a head tube traversing through the top tube second end portion and the down tube second end portion;
a steering post disposed in the head tube;
a pair of forks connected to the steering post;
a first wheel rotatable mounted to the pair of forks;
a second wheel rotatably mounted to stays extending from the seat tube; and
an electrical generating circuit mounted to one of the wheels for generating electrical power from rotation of the one wheel;
wherein the light source is electrically connected to the electrical generating circuit.

9. The bicycle frame assembly of claim 7, wherein the seat tube or the top tube includes a plurality of side facing apertures adjacent the one first and third open end for passing light from the light source.

10. The bicycle frame assembly of claim 1, further comprising:
a head tube traversing through the top tube second end portion and the down tube second end portion;
a steering post disposed in the head tube;
a pair of forks connected to the steering post;
a first wheel rotatable mounted to the pair of forks;
a second wheel rotatably mounted to stays extending from the seat tube; and
an electrical generating circuit mounted to one of the wheels for generating electrical power from rotation of the one wheel.

11. The bicycle frame assembly of claim 10, further comprising:
a light source disposed in one of the second and fourth open ends and electrically connected to the electrical generating circuit.

12. The bicycle frame assembly of claim 10, further comprising:
a USB port disposed in one of the second and fourth open ends and electrically connected to the electrical generating circuit.

13. The bicycle frame assembly of claim 1, further comprising:
a fender slidably mounted to one of the first and third open ends, and is slidable between an extended position in which the fender extends out from the one first or third open end and a retracted position in which the fender is disposed inside one of the seat tube and the top tube.

14. The bicycle frame assembly of claim 1, further comprising:
a lock cable slidably mounted to one of the first and third open ends and is slidable between an extended position in which the lock cable extends out from the one first or third open end and a retracted position in which the lock cable is disposed inside one of the seat tube and the top tube.

15. The bicycle frame assembly of claim 1, further comprising:
a bungee cord slidably mounted to one of the first and third open ends and is slidable between an extended position in which the bungee cord extends out from the one first or third open end and a retracted position in which the bungee cord is disposed inside one of the seat tube and the top tube.

16. A bicycle frame assembly, comprising:
a seat tube having first and second end portions;
a down tube having first and second end portions, wherein the down tube first end portion is mounted to the seat tube first end portion;
a top tube having first and second end portions, wherein the top tube first end portion is mounted to the seat tube second end portion and the top tube second end portion is mounted to the down tube second end portion;
wherein at least one of the seat tube second end portion and the top tube first end portion terminates in an open end;
a rack assembly comprising:
a central bar, and
a plurality of bars each rotatably mounted to the central bar and rotatable between a first position extending laterally away from the central bar and a second position extending longitudinally along the central bar;
wherein the rack assembly is slidably mounted to the open end, and is slidable between an extended position in which the central bar extends out from the open end and the plurality of bars are in the first positions and disposed outside of the open end, and a retracted position in which the plurality of bars are in the second positions and are disposed inside one of the seat tube and the top tube.

17. The bicycle frame assembly of claim 16, wherein the central bar comprises one or more channels for receiving the plurality of bars in the second positions.

18. The bicycle frame assembly of claim 16, further comprising:
   one or more springs for biasing the plurality of bars toward the first positions.

19. The bicycle frame assembly of claim 16, further comprising:
   an end bar rotatably mounted to distal ends of at least some of the plurality of bars.

20. The bicycle frame assembly of claim 16, wherein the central bar terminates with a light source.

* * * * *